United States Patent Office 3,589,975
Patented June 29, 1971

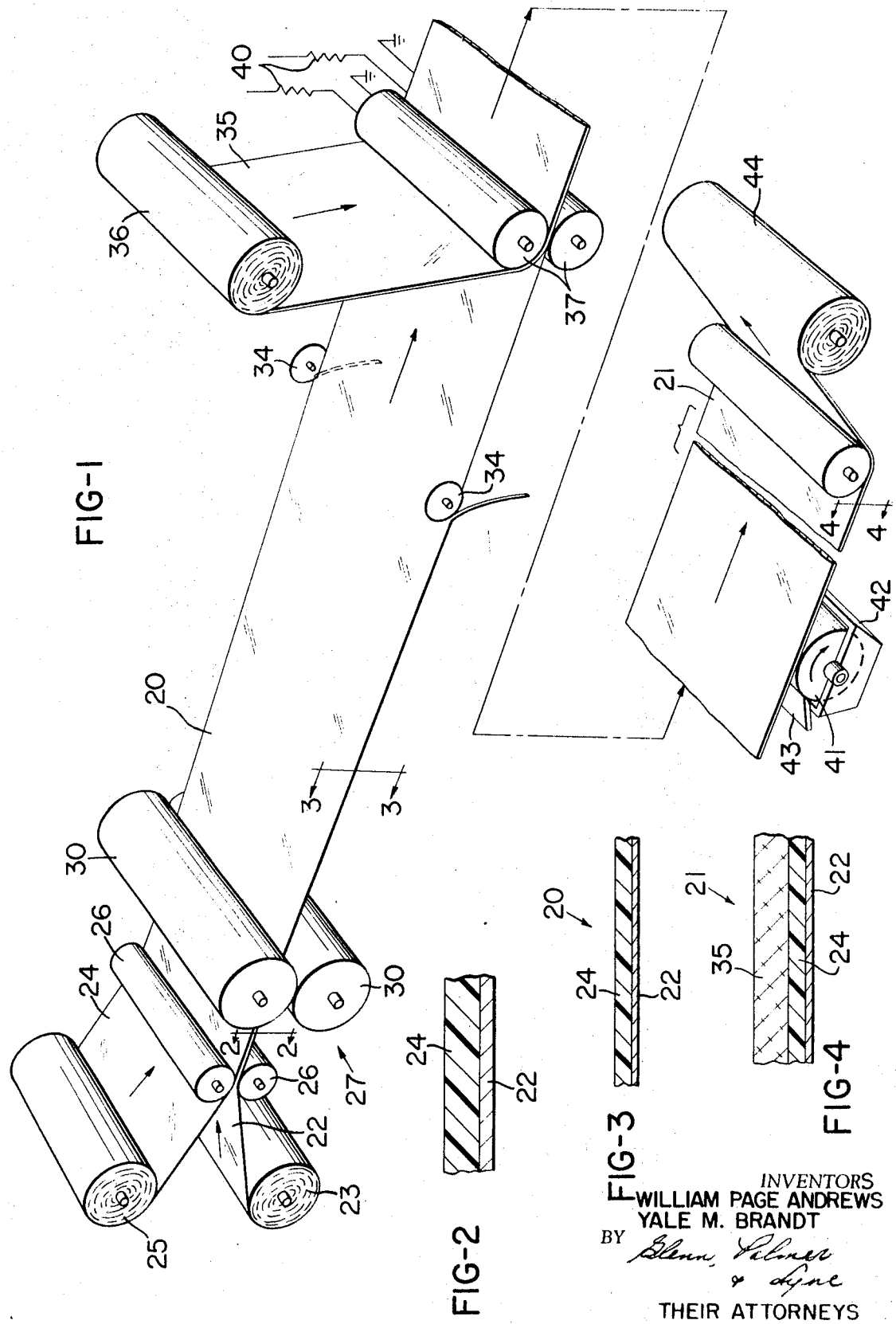

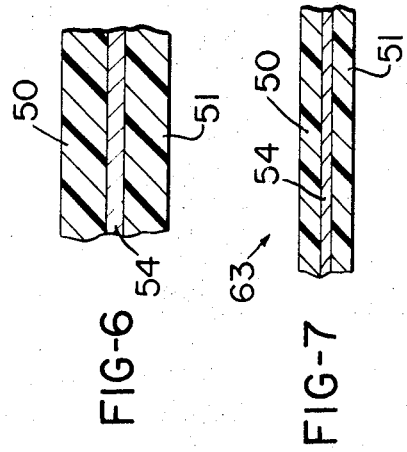
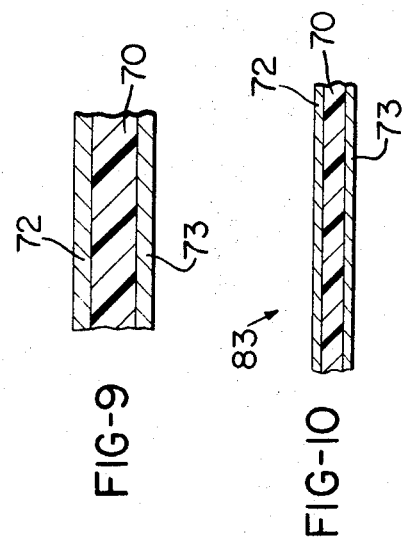
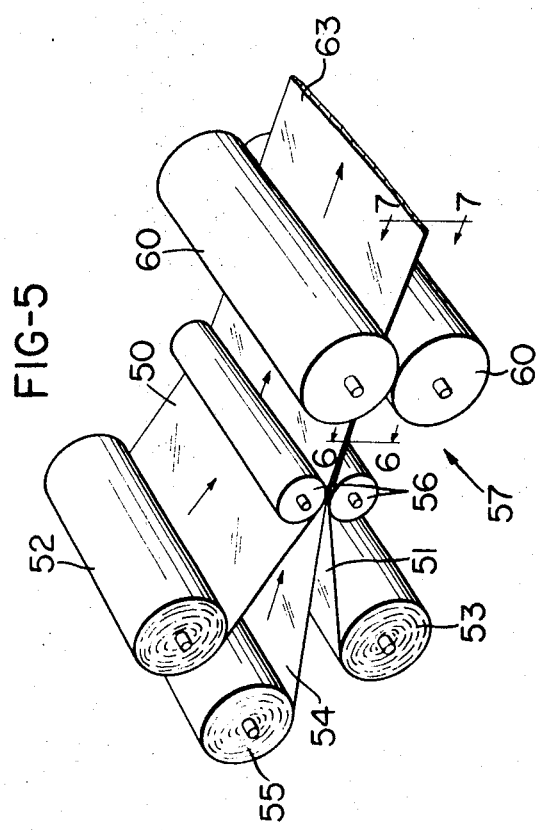
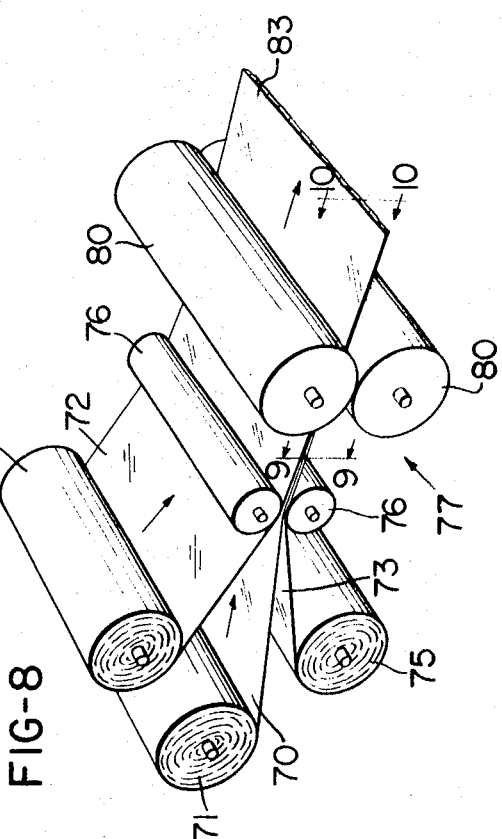

3,589,975
COMPOSITE SHEET OF PLASTIC AND METALLIC MATERIAL AND METHOD OF MAKING THE SAME
William Page Andrews, Richmond, and Yale M. Brandt, Waynesboro, Va., assignors to Reynolds Metals Company, Richmond, Va.
Filed Mar. 23, 1967, Ser. No. 625,508
Int. Cl. B32b 33/00
U.S. Cl. 161—165                                10 Claims

ABSTRACT OF THE DISCLOSURE

This disclosure relates to an improved composite sheet means comprised of webs of plastic and metallic material laminated together to provide an economical composite sheet means having a thickness which is substantially smaller than the combined thickness of the individual webs prior to lamination thereof, such composite sheet means having exceptionally high strength. Further, this disclosure also relates to a method of making such composite sheet means without requiring separate adhesive means to hold together the webs comprising such composite sheet means.

---

This invention pertains to composite sheet means and more particularly to ultra-thin multi-layer sheet means and to an improved method of making such sheet means.

Presently, multi-layer sheets comprised of plastic and metallic layers or webs are formed by first forming such plastic and metallic webs individually to as small a thickness as possible and then bonding such webs together. It is very difficult to form such webs of material to a very small thickness individually because as the thickness is reduced there is an increased tendency to tear resulting in waste and added operating expenses. The net result is that presently used composite sheets have high metal and plastic contents and are too expensive to be used competitively in many applications, such as packaging applications.

Accordingly, it is a feature of this invention to provide an improved composite sheet means made of metallic and plastic sheet means laminated together to provide such composite sheet means having minimum thickness and with minimum waste of material.

Another feature of this invention is to provide such composite sheet means having the appearance and barrier properties of standard gauge metal sheet means but at a significant reduction in cost due to the reduced metal content thereof.

Another feature of this invention is to provide improved ultra-thin composite sheet means comprised of a plurality of sheet means laminated together with optimum adhesion therebetween yet without requiring separate laminating adhesive means.

Another feature of this invention is to provide such ultra-thin composite sheet means which may have sheet means of comparatively thick material laminated to one or both sides thereof depending upon whether plastic sheet means comprises one or both outside surfaces of such ultra-thin composite sheet means yet without requiring separate adhesive means between such sheet means of material and such plastic sheet means.

Another feature of this invention is to provide an improved method of forming composite sheet means having the barrier properties of considerably thicker sheets yet at a substantial cost savings due to the reduced thickness of the component sheets of such ultra-thin composite sheet.

Another feature of this invention is to provide an improved method of forming such ultra-thin composite sheet means having sufficient strength to enable machine processing and which can be formed with minor modification of presently available sheet-forming machines.

Another feature of this invention is to provide an improved method of forming such composite sheet means having a thickness which is substantially less than the combined thickness, prior to being bonded together, of the individual sheets comprising such composite sheet means yet providing composite sheet means having high structural strength.

Another feature of this invention is to provide an improved method of making multi-layer sheet means wherein a plurality of individual webs comprising such multi-layer sheet means are bonded together in an optimum manner without requiring separate adhesive means to thereby substantially reduce the cost of such multi-layer sheet means as the result of eliminating such adhesive means as well as eliminating the step of applying such adhesive means which would otherwise be required.

Another feature of this invention is to provide an improved method of making such improved composite sheet means by cold rolling reducible plastic sheet means and metal sheet means together under controlled rolling pressure to provide a high strength bond therebetween.

Therefore, it is an object of this invention to provide improved ultra-thin multi-layer sheet means having high structural strength and having one or more of the novel features of this invention as set forth above or hereinafter shown or described.

Another object of this invention is to provide an improved method of making such multi-layer sheet means, or the like.

Other objects, uses, and advantages of this invention are apparent from a reading of this description which proceeds with reference to the accompanying drawings forming a part thereof and wherein:

FIG. 1 is a perspective view with parts in section and parts broken away schematically illustrating one exemplary embodiment of improved composite sheet means of this invention and a method of making such composite sheet means and also illustrating a paper web being heat sealed to the outside surface of a plastic heat-sealable web comprising such composite sheet means.

FIG. 2 is a sectional view on the line 2—2 of FIG. 1 illustrating a fragmentary portion of plastic and metallic webs in their stacked and aligned relation prior to passing such stacked webs through the forming roll means shown in FIG. 1.

FIG. 3 is a fragmentary sectional view on the line 3—3 of FIG. 1 illustrating the substantial reduction in thickness of such plastic and metallic webs bonded together after being passed through such forming roll means.

FIG. 4 is a sectional view on the line 4—4 of FIG. 1 illustrating the paper web adhesively bonded to the plastic web of the composite ultra-thin sheet means of FIG. 1.

FIG. 5 is a perspective view with parts in section and parts broken away schematically illustrating another exemplary embodiment of improved ultra-thin composite sheet means of this invention and a method of making such composite sheet means having a metallic web bonded between a pair of plastic webs by passing such webs through forming roll means similar to the forming roll means shown in FIG. 1.

FIG. 6 is a fragmentary sectional view on the line 6—6 of FIG. 5.

FIG. 7 is a fragmentary sectional view on the line 7—7 of FIG. 5.

FIG. 8 is a fragmentary perspective view similar to FIG. 5 and illustrating another exemplary embodiment of ultra-thin composite sheet means having a plastic web bonded between a pair of metallic webs in a manner similar to the embodiment of FIG. 5.

FIG. 9 is a fragmentary sectional view on the line 9—9 of FIG. 8.

FIG. 10 is a fragmentary sectional view on the line 10—10 of FIG. 8.

While the various features of this invention are hereinafter illustrated and described as being particularly adaptable for providing improved ultra-thin composite sheet means and an improved method of making such sheet means for packaging use, for example, it is to be understood that the various features of this invention can be utilized singly or in any combination thereof to provide such composite sheet means for other uses as desired.

Therefore, this invention is not to be limited to only the embodiments illustrated in the drawings because the drawings are merely utilized to illustrate one of the wide variety of uses of this invention.

In the exemplary embodiment of this invention illustrated in FIGS. 1-4, an improved multi-layer sheet means such as a composite sheet 20 having high structural strength is illustrated. Composite sheet 20 has a paper web bonded thereto and the construction thus provided is designated by the numeral 21 and is particularly adapted for packaging use. As will be apparent from FIGS. 1-3, the improved method of this invention requires that a plurality of separate webs of materials be stacked together in aligned or juxtaposed relation and then subjected to controlled high pressure to thereby form ultra-thin composite sheet 20 having such high structural strength and having barrier properties comparable to metal sheet means of substantially greater thickness.

In the several exemplary embodiments of this invention to be described hereinafter the stacked and aligned plastic and metal webs or sheets are preferably cold rolled between associated forming roll means to form composite sheet means of substantially reduced thickness. Although some heat is generated during the cold rolling process, suitable means may be used to assure the temperature of such forming roll means is below a predetermined level. For example, it has been fund that oil may be used to keep the temperature of such forming roll means within a range of 100 to 150° F. in some applications of this invention.

Composite sheet 20 of this example of the invention is comprised of metal sheet means, such as a web of aluminum-containing metallic foil 22 and plastic sheet means such as a web of plastic material 24 made from a thermoplastic resin. Metallic foil web 22 is provided in roll form as shown at 23 while plastic web 24 is provided in roll form as illustrated at 25. The metallic roll 23 and plastic roll 25 are both suitably supported for rotation.

Stacking means is provided for combining metallic web 22 and plastic web 24 in stacked and aligned relation and such stacking means may comprise the idlers normally used in conventional rolling practice to guide the various webs into the forming roll means. However, in this example such stacking means is shown as a pair of combining rolls each designated by the numeral 26 and adapted to receive webs 22 and 24 therebetween. The stacked and aligned webs 22 and 24 are then psssed through suitable forming roll means.

The forming roll means of this example of the invention comprises a rolling mill as shown generally at 27. Rolling mill 27 is shown as a two-high rolling mill having a pair of oppositely arranged generally cylindrical rolls each designated by the numeral 30. Cylindrical rolls 30 are preferably of known conventional construction and are suitably supported for rotation and may include any conventional means for bringing them together in a controlled manner to provide a predetermined controlled pressure therebeween. Because of its conventional nature the apparatus for providing such controlled pressure is not illustrated.

During the cold rolling of the stacked and aligned webs 22 and 24, such webs and forming rolls may become quite warm. The preferred practice is to keep the forming rolls roughly at normal room ambient temperature by any suitable means without monitoring the temperature of the webs. The bearings for each forming roll may also be kept at room ambient temperature in some applications.

Rolls 30 or rolling mill 27 are driven so as to compress therebetween the stacked and aligned webs 22 and 24, having a thickness as illustrated in FIG. 2 of the drawings, under controlled high pressure. The application of such controlled high pressure results in a substantial reduction in the thickness of the individual webs 22 and 24 from their original thickness and provides the high-strength multi-layer sheet means 20 as shown in FIG. 3. As will be apparent from the drawings, each individual web 22 and 24 is reduced to approximately fifty percent of its original thickness.

After forming composite sheet 20 in forming mill 27, the opposite side edges thereof are trimmed to eliminate any excess or jagged material. The trimming means preferably comprises a pair of spaced apart rotary knives each designated by the numeral 34. Rotary knives 34 are suitably driven and operate against suitable knife supports so as to cut away the uneven side edge portions of composite sheet 20 as it moves thereunder.

The ultra-thin composite sheet 20 thus provided has numerous applications in the form illustrated, such as for inner liners for container means, for overwraps, etc. However, it may be desirable to adhesively bond another layer of comparatively inexpensive material to composite sheet 20 to give it more strength and rigidity and make it more readily usable in numerous packaging applications. For example, it may be desirable to adhesively bond an inexpensive, comparatively thick web of material, such as paper, to a surface of composite sheet 20.

In this example of the invention a web of paper designated by the numeral 35 is provided and such paper web 35 is bonded to sheet 20, as shown in FIG. 1, to provide a structure as illustrated in cross section in FIG. 4 of the drawings. The paper web is simply and easily adhesively bonded to composite sheet 20 by engaging paper web 35 against the plastic heat-sealable surface defined by plastic web 24 of sheet 20, while subjecting composite sheet 20 and paper web 35 to a heat environment. In some applications it has been found that suitable preheating of the web prior to lamination thereof may increase the subsequent laminating efficiency.

Paper web 35 is provided in roll form as shown at 36 and such roll is suitably supported for rotation. Paper web 35 is combined with composite sheet 20 by passing sheet 20 and web 35 through a pair of cooperating rolls each designated by the numeral 37. Rolls 37 are preferably heated as by electrical resistance heating elements provided therein and indicated schematically by an electrical resistance element 40 for each roll 37. A suitable electrical ground connection is provided for each roll 37.

As the paper web is brought into contact with the plastic layer 24 of composite sheet 20 and subjected to controlled heat provided by rolls 37, paper web 35 is heat sealed to sheet 20 to define the construction indicated by the numeral 21 and as shown in sectional view in FIG. 4. Lamination of composite sheet 20 to substrate 35 is performed substantially by heat alone requiring only contact pressure from the rolls which are heated in the range of 150 to 700° F.

As will be apparent from FIG. 4 the composite construction 21 uses a minimum of the expensive plastic heat-sealable web 24 and the metallic web 22, yet has the desired stiffness preferred in many packaging applications and provided by comparatively large thickness paper webs. Although the thickness of plastic web 24 and metallic web 22 is kept at a bare minimum, it is sufficient to provide a moisture barrier in some packaging applications which is as effective as similar barriers which use considerably more metal and plastic and are thus much more expensive.

The metallic outer surface, defined by web 22, of multilayer construction 21 is preferably coated with a suitable coating to provide protection against corrosion or the like. The protective coating is provided by an applicator roll 41 which is rotated in a suitable protective coating material contained in a reservoir 42. A doctor blade illustrated at 43 assures that only the proper thickness of the protective coating material is applied against the outer surface of web 22.

The composite sheet 21, with protective coating applied to web 22, is rolled on suitable roll means, illustrated as a roll 44 for subsequent use as required.

Thus, it is seen that FIGS. 1-4 illustrate one embodiment of ultra-thin composite sheet means of this invention and a method of making same wherein the application of controlled pressure against stacked and aligned webs 22 and 24 results in a reduction in thickness of fifty percent or greater as will be apparent from FIGS. 2 and 3. Also it has been shown through testing and use of the improved ultra-thin composite sheet means of this invention that the forming as described above does not affect the heat-sealing characretristics of the plastic material employed.

It will be appreciated that more two webs of material may be used to form an essentially sandwich-type ultra-thin construction. FIGS. 5-7 illustrate another embodiment of composite sheet means, designated by the numeral 63, as well as the method of forming composite sheet 63 in which a metallic web is bounded between a pair of plastic webs.

As seen in FIG. 5, a pair of plastic webs designated by the numerals 50 and 51 are preferably provided in roll form as shown at 52 and 53 respectively. Each roll 52 and 53 is suitably supported for rotation.

Plastic webs 50 and 51 are arranged on either side of a metallic web 54 which is provided in roll form as illustrated at 55. Metallic web 54 is sandwiched between plastic webs 50 and 51 and webs 50, 51, and 54 are stacked in aligned relation by any suitable stacking means. The stacking means of this example of the invention is shown as a pair of cooperating stacking and aligning rolls each designated by the numeral 56.

With the metallic foil 54 sandwiched between plastic webs 50 and 51, the sandwich construction is then passed through a rolling mill indicated at 57 and comprising a pair of rolls each designated by the numeral 60. The rolls 60 have means enabling them to be suitably compressed together under controlled pressure as previously mentioned in connection with rolls 30 of the previous embodiment.

The relative size of the plastic webs 50 and 51 and the metallic foil web 54 prior to simultaneously subjecting them to the controlled pressure of rolls 60 is shown in FIG. 6. The reduction in thickness of webs 50, 51, and 54 achieved after passing them through rolls 60 is shown in FIG. 7 and results in ultra-thin composite sheet means or sheet 63 having remarkably high structural strength for its thickness.

It will be appreciated that the arrangement of plastic webs 50 and 51 on either side of metallic foil web 54 and the exemplary apparatus shown in FIG. 5 could be used with the apparatus illustrated in the downstream portion of FIG. 1. In a similar manner as in FIG. 1, composite sheet 63 could also have a paper web adhesively bonded thereto on one or both sides in a similar manner as previously illustrated and described in FIG. 1.

In the embodiment of this invention illustrated in FIGS. 8-10 composite ultra-thin sheet means designated by the numeral 83 is provided which is formed in a similar manner as sheet means 63.

Composite sheet 83 comprises a web of plastic designated by the numeral 70 and carried on a suitable roll shown at 71. Plastic web 70 in this embodiment is sandwiched between a pair of metallic webs 72 and 73 respectively carried for rotation on rolls shown at 74 and 75.

In a similar manner as described above with respect to FIG. 5 of the drawings, plastic web 70 is aligned and stacked between metallic webs 72 and 73 by any suitable stacking means and shown in this exemplary embodiment of the invention as a pair of aligning and stacking rolls each designated by the numeral 76. An example of the relative size of the thus stacked and aligned plastic web 70 and the sizes of the metallic webs 72 and 73 arranged on either side thereof is illustrated in FIG. 9.

The stacked assembly is then passed through a rolling mill designated by the numeral 77 and having a pair of rolls each designated by the numeral 80. Rolls 80 also have suitable means for applying a controlled high pressure and thus compress together metallic foil webs 72 and 73 with plastic web 70 sandwiched therebetween.

The composite ultra-thin sheet means 83 is illustrated in section view in FIG. 10 after having been reduced to approximately fifty percent of the thickness illustrated in FIG. 9.

Thus, it is seen that irrespective of whether the construction of FIG. 3, 7, or 10 is used the resultant composite sheet means is ultra-thin, has high strength, and has great tear resistance. Furthermore, such composite sheet means can be easily bonded or otherwise fastened to other materials to economically produce laminated constructions of all types for decorative and/or protective uses, as desired.

The exemplary composite ultra-thin sheet means presented above have been preferably formed in each instance by cold roll bonding techniques simply by using controlled high pressures. However, it will be appreciated that such composite sheet means may be formed using hot roll bonding techniques wherein the various forming rolls may be provided with suitable heating means to enable forming such composite sheet means using both controlled heat and pressure. Also, the various sheet means may be formed by extrusion coating immediately adjacent the compressing roll means.

The various embodiments of the ultra-thin sheet means of this invention illustrated in the drawings show a thickness reduction of about fifty percent. Thickness reductions as great at 70 percent have also been satisfactorily achieved in both the plastic and metallic webs using the improved method of this invention.

Each embodiment of composite sheet means presented in this disclosure has been shown as being formed by a single pass through associated forming roll means. However, it is to be understood that each composite sheet means may be further reduced by a plurality of forming passes through associated roll means, if desired.

One example of the improved ultra-thin composite sheet means of this invention which has been produced and successfully tested will now be described in detail and used 1235 DSDA aluminum foil as the metal sheet means suitably bonded to a thermoplastic material sold under the name of Surlyn A.

Surlyn A is an ionomer resin, wherein the term "ionomer" describes ionized olefin copolymers, manufactured by the Poloyolefins Division of the E. I. du Pont de Nemours and Company, Incorporated of Wilmington, Del. Surlyn A is particularly adaptable for use in forming ultra-thin composite sheet means because it can be rolled without shattering and has excellent adhesion to metal foil.

A web of 1235 metal foil 28 inches wide and .001 inch thick was combined with a web of Surlyn A also 28 inches wide and .001 inch thick to form the above mentioned composite sheet which was successfully tested. The combined webs were passed through a 4-high flood mill in which the form rolls had a .005 inch crown and the roll temperature was controlled at approximately 100–150° F. using a mixture of kerosene and mineral oil which was also used to lubricate the composite sheet.

The plastic web or film traveled from a secondary unwind station to the nip on the upper surface of the 1235 aluminum foil and tension was used to keep the film free of wrinkles. The final ultra-thin composite sheet means thus produced resulted in a 50 percent reduction in both the 1235 aluminum foil and the Surlyn A, whereby the composite sheet which was successfully tested consisted of a .0005 inch thick layer of 1235 aluminum foil bonded to a .0005 inch thick layer of Surlyn A.

The following table compares certain physical properties of aluminum foil .0009 inch thick and .00035 inch thick with the above composite of .0005 inch thick aluminum foil and .0005 inch thick Surlyn A.

| Property | .0009" foil | Composite | .00035" foil |
|---|---|---|---|
| Tensile, lbs. | | | |
| MD[1] | 9.0 | 10.2 | 2.2 |
| CD[2] | 8.6 | 8.7 | 1.8 |
| Ultimate Strength, p.s.i. | | | |
| MD | 10,000 | 9,300 | 6,300 |
| CD | 9,600 | 7,900 | 5,100 |
| Elongation, percent | | | |
| MD | 4.7 | 4.2 | 1.5 |
| CD | 5.0 | 2.0 | 1.1 |
| Mullen, p.s.i. | 22.7 | 35.8 [3] / 46.8 [4] | 4.5 |
| Tear, Elmendorf, gms., | | | |
| MD | 29.8 | 28.2 | 6.5 |
| CD | 25.4 | 34.0 | 6.5 |
| Edge tear, lbs., | | | |
| MD | 1.10 | 1.1 | 0.20 |
| CD | 1.14 | 2.1 | 0.25 |
| Yield, square in. per lb | 11,400 | 15.200 | 29,300 |

[1] Machine direction.
[2] Cross direction.
[3] To foil burst.
[4] To plastic burst.

Thus, it is seen from the above comparison of physical properties that the improved composite sheet of this invention provides superior performance while using a comparatively small amount of aluminum foil and plastic material.

Because of its potential cost savings, the improved composite sheet means of this invention has been proposed for many applications.

Cost estimates have revealed a decided cost advantage using such improved composite as a substitute for foil and adhesive in many packaging applications. For example, in the case of a standard oleomargarine wrap, the standard specification contains .00035 inch thick aluminum foil while the proposed composite specification contains .0002 inch thick aluminum foil and .00015 inch thick Surlyn A providing a considerable cost saving.

Although cold, i.e. unheated, forming rolls were used in forming the improved composite sheet in the above example of this invention, such rolls generate considerable heat during roll forming and as previously mentioned were controlled using a suitable oil to provide a temperature within the range of 100–150° F.

Present operations indicate that the temperature of the forming rolls is preferably controlled so that it is approximately equal to normal room ambient temperature. Also, the lubricant oil used is preferably one of comparatively low viscosity such as Varsol or mixtures of Varsol and palm oil.

In forming the composite sheet means of this invention it has been found that improved adhesion is provided between the various webs comprising a given composite sheet means. Such improved adhesion is due to the intimate contact of freshly exposed surfaces created during such roll forming.

In another example of this invention, plastic webs made of a heat-sealable thermoplastic resin and each having a thickness of .001 inch were employed on either side of an aluminum foil web having a thickness of .0004 inch. After simultaneously roll forming and compressing in a manner as illustrated and shown in FIG. 5, the thickness of the aluminum foil in the composite sheet was reduced to .0002 inch while the thickness of the plastic webs were each similarly proportionately reduced on either side thereof to a thickness of .0005 inch.

Although the improved method of this invention is particularly adaptable for providing ultra-thin composite sheet means, it will be appreciated that an improved composite construction of substantial thickness may also be effectively provided in accordance with the teachings of this invention.

It may be desired in some applications to provide a composite ultra-thin sheet having a soft metal comprising one of its layers. In the event such a composition is desired, the composite sheet is subjected to a controlled temperature environment preferably provided in the form of a suitable annealing oven, or the like, having suitable temperature control means to enable annealing such metallic web to provide a comparatively soft layer for the resulting high-strength composite sheet means. Of course, annealing is accomplished at a temperature compatible with both the particular type of metal sheet means used to form the ultra-thin composite sheet means and with the decomposition temperature of the particular plastic web employed in such composite sheet.

As previously mentioned the metallic sheet means preferably comprises metallic foil containing aluminum. It has been found through testing that it is not economically practical (using present techniques) to attempt to reduce aluminum foil to the small thickness which to date are only economically obtained using the improved method of this invention.

While it might appear that the strength of the composite sheet means of this invention would be about equal to the total strength of separate sheets of reduced thickness, it has been found that the strength of such composite sheet means is considerably greater. Also, such composite sheet means has little tendency to tear and good puncture resistance.

As previously indicated Surlyn A has been used successfully in making composite sheet means of this invention. Surlyn A has proven exceptional in achieving very small gauge reductions of aluminum foil without requiring special treatment of the Surlyn A or the aluminum. Tests have shown that Surlyn A and aluminum foil are each reduced about equally in direct proportion to their individual thickness and this fact will be readily apparent from the sectional views illustrated in the drawings for the various embodiments of this invention and from the example of composite sheet means previously presented.

It will be appreciated that the improved high strength composite sheet means of this invention may be formed using any suitable plastic material. For example, materials such as polypropylene, polyethylene terephthalate, sold under the name of Mylar, polyvinyl chloride, and nylon may also be used, as desired.

For ease of description and presentation, the composite ultra-thin sheet means 20, 63, and 83 have been illustrated as being formed using two-high compressing roll means in each instance. Of course, the number of rolls employed in each compressing mill is not controlling and any number of rolls may be used. In actual practice four-high mills are preferred and have been used successfully to produce the exemplary composite ultra-thin sheet means previously disclosed.

The exposed plastic surface of composite sheet 20 is illustrated as having an inexpensive paper web 35 heat bonded thereto. Obviously, any suitable material may be suitably heat bonded to the exposed plastic surfaces of composite sheets 20 and 63 inclduing, for example, tissues, glassine, metallic sheet means, cellophane, Mylar, acetates, and other plastic films.

The heat bonding of a suitable substrate to the exposed plastic surface of the composite sheet is achieved without requiring a separate adhesive and by passing such composite sheet with the plastic surface adjoining the substrate through a heated nip roll. Roll temperatures of 300–350° F. have been successfully used to produce laminates at speeds up to 120 ft. per minute.

Reference has been made in this disclosure to the use of the composite sheet means of this invention in packaging applications as an example of its uses. However, it is to be understood that such composite sheet means may be used in a large variety of applications including in the building industry; again, by way of example, where it may be used in building materials such as insulating sheet means, wall panels, wall paper, and the like.

Thus, the composite construction of this invention is not only economical because of the reduced thickness of the metallic sheet means and plastic sheet means but also because of the elimination of separate adhesive materials and the processing step necessary to apply such separate adhesive means currently used to make similar composite sheet means.

Thus, it is seen that this invention provides an improved ultra-thin composite sheet means of high strength comprised of metallic sheet means bonded to plastic sheet means.

Further, this invention provides an improved method of making such ultra-thin composite sheet means.

While the form of the invention now preferred has been disclosed as required by statute, other forms may be used, all coming within the scope of the claimed subject matter which follows.

What is claimed is:
1. A method of forming a thin, high-strength, multilayer sheet comprising the steps of:
   (a) providing a layer of aluminum foil;
   (b) applying a layer of a thermoplastic material in juxtaposed contact wth said aluminum foil; and
   (c) rolling said juxtaposed layers to reduce their thicknesses by at least 20 percent and simultaneously to expose and bond together fresh surfaces of aluminum and thermoplastic material.
2. The method of claim 1 wherein said reduction in thickness does not exceed 80 percent.
3. The method of claim 1 wherein said juxtaposed layers are rolled more than once.
4. The method of claim 1 wherein both said layer of aluminum foil and said layer of thermoplastic material are provided as discrete, unadhered webs.
5. The method of claim 1 wherein said layer of said thermoplastic material is applied to said layer of aluminum foil by extrusion coating.
6. The method of claim 1 wherein another layer of thermoplastic material is applied in juxtaposed contact with said layer of aluminum foil to form a sandwich of said layer of aluminum foil between said two layers of thermoplastic material, and said rolling reduces the combined thickness of said sandwich by at least 20 percent and simultaneously exposes and bonds fresh surfaces of aluminum and thermoplastic material at both sides of said layer of aluminum foil.
7. The method of claim 1 wherein a second layer of aluminum foil is provided in juxtaposed contact with said layer of thermoplastic material to form a sandwich of said layer of thermoplastic material between said two layers of aluminum foil, and sid rolling reduces the combined thickness of said sandwich by at least 20 percent and simultaneously exposes and bonds together fresh surfaces of aluminum and thermoplastic material at both sides of said layer of thermoplastic material.
8. The method of claim 1 wherein the thicknesses of each said layer are generally on the order of thousandths of an inch before said rolling and generally on the order of ten thousandths of an inch after said rolling.
9. The method of claim 1 wherein said rolling step is performed by rolls, and comprising the further step of applying a cooling fluid to said rolls so that their temperature does not exceed 150 degrees Fahrenheit.
10. A thin, high-strength sheet comprising a layer of aluminum foil bonded to a layer of a thermoplastic material, said sheet having been made by the method of claim 1.

References Cited

UNITED STATES PATENTS

| | | | |
|---|---|---|---|
| 3,454,445 | 7/1969 | Durst et al. | 161—214X |
| 3,457,139 | 7/1969 | James | 156—324 |
| 3,194,863 | 7/1965 | Williams, Jr. et al. | 264—280X |
| 3,047,934 | 8/1962 | Magner, Jr. | 156—324UX |
| 3,382,136 | 5/1968 | Bugel et al. | 161—216UX |
| 2,861,022 | 11/1958 | Lundsager | 161—214 |
| 3,051,598 | 8/1962 | Chipman et al. | 161—165 |

FOREIGN PATENTS

| | | | |
|---|---|---|---|
| 1,003,107 | 9/1965 | Great Britain | 156—160 |

PHILIP DIER, Primary Examiner

U.S. Cl. X.R.

29—472.9; 156—244, 306, 324; 161—216, 220